(No Model.)
C. C. HAIR.
CULTIVATOR, HARROW, AND SEEDER.
No. 450,150. Patented Apr. 14, 1891.
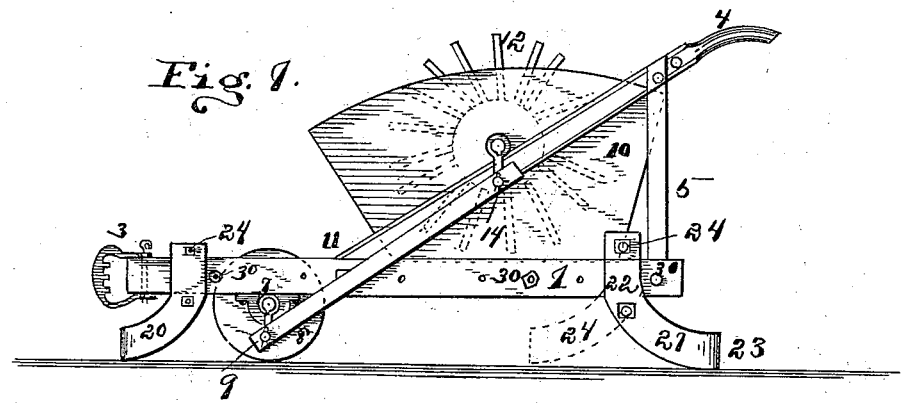
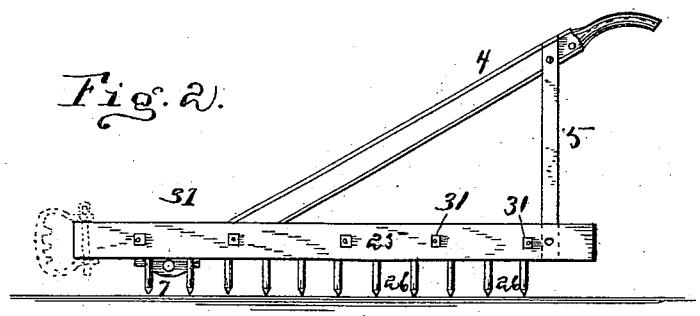
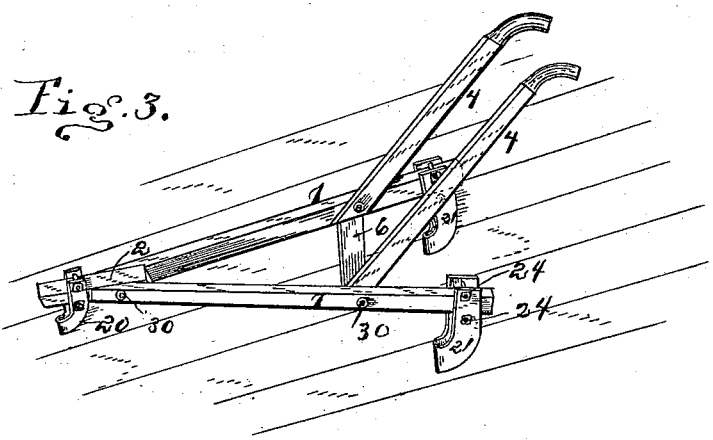
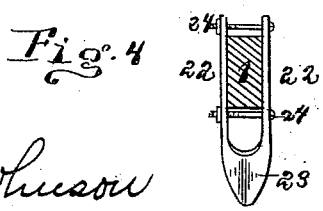
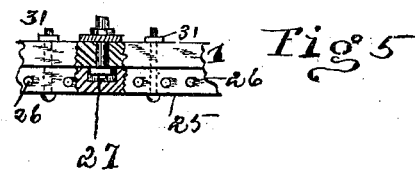

UNITED STATES PATENT OFFICE.

CHRISTOPHER C. HAIR, OF FARMERVILLE, LOUISIANA.

CULTIVATOR, HARROW, AND SEEDER.

SPECIFICATION forming part of Letters Patent No. 450,150, dated April 14, 1891.

Application filed August 7, 1890. Serial No. 361,297. (No model.)

*To all whom it may concern:*

Be it known that I, CHRISTOPHER C. HAIR, residing at Farmerville, in the parish of Union and State of Louisiana, have invented certain new and useful Improvements in Farm Cultivators, Harrows, and Seeders, of which the following is a specification, reference being had therein to the accompanying drawings.

This invention relates to farm implements such as may be used for seed planters, cultivators, harrows, and for other uses on the farm and plantation.

The object of the invention is to produce a serviceable and convenient implement adapted to a large variety of field cultivation.

Figure 1 is a side elevation of the implement adapted for use as a cotton-seed planter and coverer. Fig. 2 is a side elevation of the implement as a harrow. Fig. 3 is a perspective of the implement arranged as a cultivator. Fig. 4 is a detail of one of the cultivator-plows. Fig. 5 is a detail partly sectioned, showing attachment of harrow-bar to cultivator-beam.

The numeral 1 indicates one of the side beams which go to make up the cultivator-frame. The side beams are attached together at the front with or without a filling-piece 2, and a clevis 3 is attached in the usual manner. Handles 4 4 are connected to the beam 1, and handle-braces 5 5 may be used or not, as desirable. The beams 1 1 are held apart at the rear by a cross-bar 6, Fig. 3. The beams 1 1 have bearing-boxes 7 near their front ends, and a drive-wheel 8 may have its axle journaled in said boxes. When the wheel is used, its axle 11 is provided with a crank 9.

The seed box or hopper 10 is mounted on cross-bar 6. The box has a small opening in the bottom, as usual in cotton-seed planters, and a stirring-wheel 12 is journaled on axle 13, extending through the box from side to side. Axle or shaft 13 has a crank 14, which is connected by pitman 15 with the crank 9 on the wheel-shaft 11. By this connection of wheel 8 to the stirrer-wheel 12 the wheel 12 is driven as the implement is drawn forward and the seeds in the box 10 are prevented from packing and will drop through the opening in the bottom of the box.

The front end of the beam 1, when the implement is used as a planter or cultivator, carries a cultivator-plow 20, which will be afterward described. The plow 20 will open a furrow and the wheel 8 will run in this furrow. The seed from the box 10 will fall into this furrow when used as a seed-planter.

The cultivator plows and coverers 21 are attached at the rear of the beam 1. These plows 21 are composed of bars 22 22 nearly parallel and joining with a curve at 23. Bolts 24 24 pass through holes in the side bars of the plows, one bolt passing above and the other below the beam, as in Fig. 4. The plow can thus be turned either way on the beam, it being necessary only to remove the top bolt 24 in order to remove the plow from the beam in order to reverse the plow. The front plow 20 is similar to plows 21 and can be reversed on the beam or be removed. When the rear plows are arranged as in Fig. 1, they serve to draw the dirt toward the median line of the implement, thus acting to cover the seeds. When turned as in Fig. 3, the plows serve as cultivator-plows.

The wheel 8 and its shaft and the seed-box and connection to wheel 8 are removable. This permits the use of the device as a cultivator by reversing the rear plows.

The plows are interchangeable, so that the ones which are worn the most may be replaced by others. Of course a proper number of plows may be used on each beam.

The plows 20 and 21 may be removed as well as the seeder attachment, and harrow-bars 25 may be bolted to each of the beams 1. These bars 25 are wooden strips provided with harrow-teeth 26.

The bars 25 are notched or cut away at 27, so that the bars 25 may lie close against bars 1, the nuts 30 lying in such recess as that 27 in the harrow-tooth bars. The bars 25 are held to bars 1 by bolts 31 passing through both bars 1 and 25. Thus the harrow-tooth bars 1 and 25 may be secured together. If desirable, the plow 20 may be used along with the cultivator-teeth 26 and the implement used for opening a furrow and pulverizing the soil near the furrow at the same time.

What I claim is—

1. The triangular frame composed of beams and braces and adapted to receive the seeding device, the adjustable plows and the removable tooth-bars and their fastening-clamps, whereby the implement may be adapted to different uses, substantially as described.

2. The combination, with the triangular frame composed of beams and braces, of the seed-hopper, the driver and the stirring-wheel within the hopper connected and removable, as described, and the reversible plows on the frame adjustable to position to serve as cultivators or seed-coverers, substantially as described.

3. The combination, with the triangular frame composed of beams 1 1 and braces, of the reversible plows 21 21, composed of bars passing at each side of the beam, and bolts passing through the plows above and below the beam, substantially as described.

In testimony whereof I affix my signature in presence of two witnesses.

C. C. HAIR.

Witnesses:
JAS. M. SMITH,
J. K. ATKINSON.